United States Patent
Homer et al.

(10) Patent No.: US 9,684,334 B2
(45) Date of Patent: Jun. 20, 2017

(54) TABLET COMPUTER OVERLAY MEMBRANE

(71) Applicant: Hewlett-Packard Development Company, L.P., Houston, TX (US)

(72) Inventors: Steven S. Homer, Tomball, TX (US); Paul J. Doczy, Cypress, TX (US); Kevin Massaro, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/514,483

(22) Filed: Oct. 15, 2014

(65) Prior Publication Data

US 2015/0029653 A1   Jan. 29, 2015

Related U.S. Application Data

(63) Continuation of application No. 11/263,263, filed on Oct. 31, 2005, now Pat. No. 8,907,898.

(51) Int. Cl.
*G06F 3/16* (2006.01)
*G06F 1/16* (2006.01)

(52) U.S. Cl.
CPC .......... *G06F 1/1618* (2013.01); *G06F 1/1626* (2013.01); *G06F 1/1632* (2013.01); *G06F 1/1654* (2013.01); *G06F 1/1656* (2013.01); *G06F 1/1669* (2013.01); *G06F 1/1681* (2013.01)

(58) Field of Classification Search
CPC ........ G06F 1/1613; G06F 1/1616; G06F 3/02; G06F 3/0202; G06F 3/0216; G06F 1/1618; G06F 1/1626; G06F 1/1632; G06F 1/1654; G06F 1/1656; G06F 1/1669; G06F 1/1681
USPC .............. 345/168, 169; 361/679.08, 679.11, 361/679.15, 679.17; 341/22–34
See application file for complete search history.

(56) References Cited

U.S. PATENT DOCUMENTS

| | | | | |
|---|---|---|---|---|
| 4,209,735 A | * | 6/1980 | Yoshida | G06F 1/26 361/679.21 |
| 5,295,089 A | * | 3/1994 | Ambasz | G06F 1/1628 348/791 |
| 6,585,162 B2 | * | 7/2003 | Sandbach et al. | 235/462.44 |
| 6,636,204 B2 | * | 10/2003 | Santoh | G06F 1/1616 345/169 |
| 6,781,819 B2 | | 8/2004 | Yang et al. | |
| 6,882,524 B2 | | 4/2005 | Ulla et al. | |
| 6,944,012 B2 | | 9/2005 | Doczy et al. | |
| 2004/0090742 A1 | | 5/2004 | Son et al. | |
| 2004/0212954 A1 | | 10/2004 | Ulla et al. | |
| 2004/0233620 A1 | | 11/2004 | Doczy et al. | |
| 2004/0266502 A1 | * | 12/2004 | Holtorf | B32B 3/04 455/899 |
| 2005/0057518 A1 | * | 3/2005 | Ghosh | G06F 1/1601 345/168 |
| 2005/0057891 A1 | | 3/2005 | Madsen et al. | |
| 2005/0200559 A1 | | 9/2005 | Koyama et al. | |

* cited by examiner

*Primary Examiner* — Sahlu Okebato
(74) *Attorney, Agent, or Firm* — HP Patent Department

(57) ABSTRACT

A tablet computer device comprises a overlay membrane detachably couplable to the tablet computer device to protect a display element of the tablet computer device, the overlay membrane having an integrated keyboard.

21 Claims, 4 Drawing Sheets

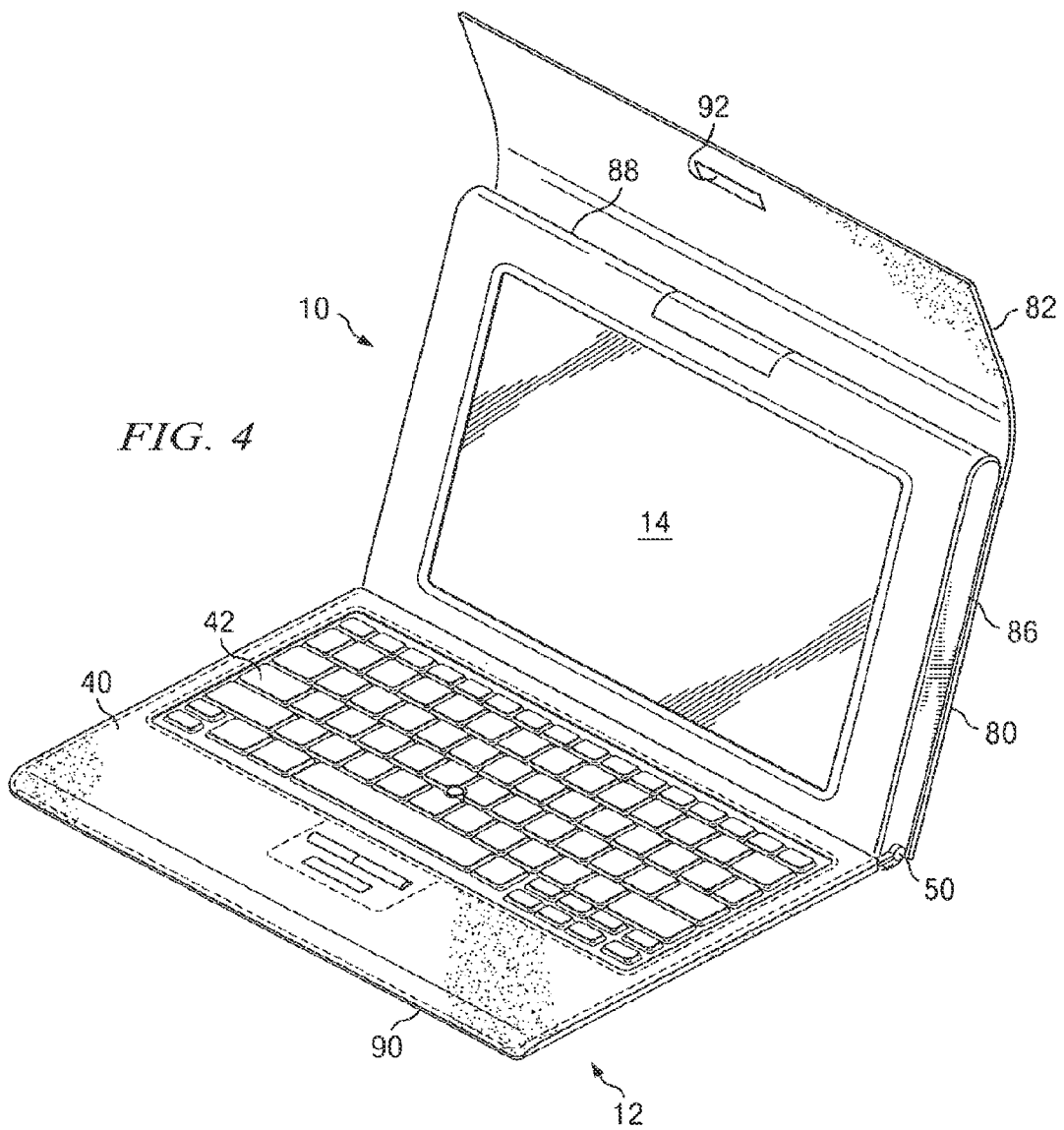

US 9,684,334 B2

TABLET COMPUTER OVERLAY MEMBRANE

CROSS-REFERENCE TO RELATED APPLICATIONS

This application is a Continuation of copending U.S. patent application Ser. No. 11/263,263, filed on Oct. 31, 2005, and incorporated herein by reference.

BACKGROUND OF THE INVENTION

Tablet computer devices are becoming increasingly popular. For example, tablet computer devices provide a portable and convenient computing solution with a display element for displaying content to a user and receiving input from a user (e.g., by an electronic pen and/or stylus). However, if the electronic pen and/or stylus should become lost, misplaced or inoperable, input to the tablet computer device 10 is more difficult. Additionally, in contrast to a notebook computer where a base member protects a display element when the notebook is closed, a display element of a tablet computer device is generally exposed and more susceptible to damage.

BRIEF DESCRIPTION OF THE DRAWINGS

For a more complete understanding of the present invention and the advantages thereof, reference is now made to the following descriptions taken in connection with the accompanying drawings in which:

FIG. 4 is a diagram illustrating another embodiment of a overlay membrane in accordance with the present invention.

DETAILED DESCRIPTION OF THE DRAWINGS

The preferred embodiments of the present invention and the advantages thereof are best understood by referring to FIGS. 1-4 of the drawings, like numerals being used for like and corresponding parts of the various drawings.

Figure 1:
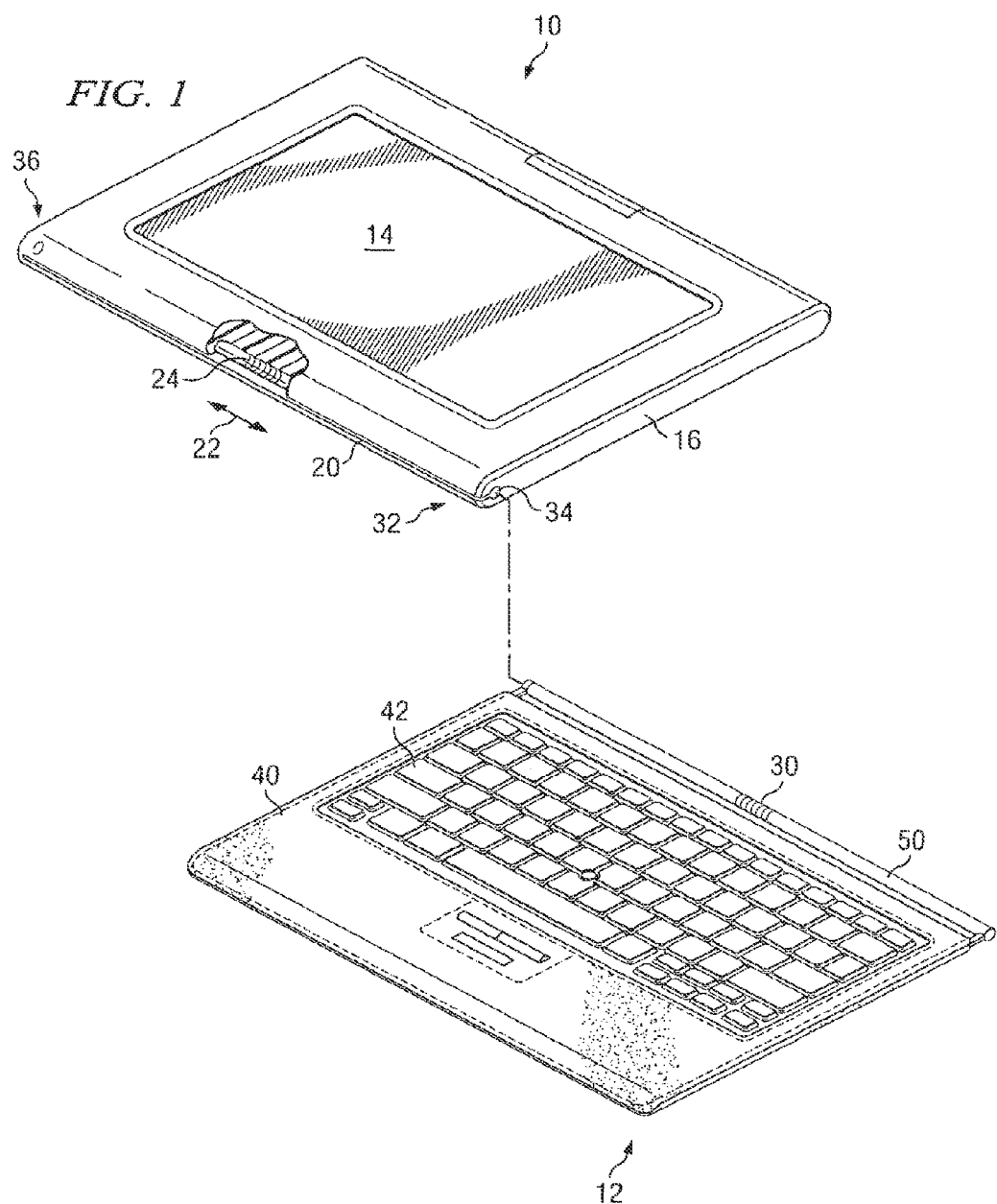
FIG. 1 is a diagram illustrating an embodiment of a tablet computer device and overlay membrane in accordance with the present invention.

FIG. 1 is a diagram illustrating an embodiment of a tablet computer device 10 and a overlay membrane 12 in accordance with the present invention. In the embodiment illustrated in FIG. 1, tablet computer device 10 comprises a display element 14 for receiving input from a user and/or displaying an output to a user. In the embodiment illustrated in FIG. 1, a housing 16 of tablet computer device 10 is configured to receive and/or otherwise be detachably couplable to overlay membrane 12 to facilitate protection of display element 14 by overlay membrane 12. For example, tablet computer device 10 and overlay membrane 12 are configured to cooperatively engage each other such that overlay membrane 12 is positionable over display element 14 to protect display element 14.

In the embodiment illustrated in FIG. 1, housing 16 of tablet computer device 10 comprises an elongate cavity 20 extending an entire dimension of tablet computer device 10 along a direction indicated generally by 22. As used herein, an "entire" dimension shall mean an entire dimension or substantially an entire dimension of tablet computer device 10. In the embodiment illustrated in FIG. 1, tablet computer device 10 comprises a connector element 24 disposed within cavity 20 for communicatively engaging overlay membrane 12. Connector element 24 may comprise any type of connector such as, but not limited to, a spring or biased element connector for engaging a corresponding connector element 30 disposed on overlay membrane 12.

In the embodiment illustrated in FIG. 1, cavity 20 is disposed along a side or peripheral location 32 of tablet computer device 10 and comprises an open end 34 and a closed end 36. However, cavity 20 may be otherwise located on tablet computer device 10 (e.g., on another side of tablet computer device 10). Further, in some embodiments of the present invention, tablet computer device 10 may be configured with multiple cavities 20 to facilitate detachably coupling of overlay membrane 12 to different locations of tablet computer device 10 (e.g., disposed on opposite sides, adjacent sides and/or all sides). It should also be understood that overlay membrane 12 may be detachably coupled to other non-side and/or non-peripheral locations of tablet computer device 10 (e.g., attachable to a rear or back portion of housing 16, front portion of housing 16, etc.).

In the embodiment illustrated in FIG. 1, overlay membrane 12 comprises a panel 40 having an integrated keyboard 42. Preferably, overlay membrane 12 is fabricated from a thin (in some embodiments of the present invention, ultra-thin), soft and/or flexible material to facilitate conforming of overlay membrane 12 to a shape and/or contour of tablet computer device 10 such as, but not limited to, leather or a pliable/deformable plastic material, and to provide a non-scratch cover for display element 14. In the embodiment illustrated in FIG. 1, overlay membrane 12 comprises an elongate member 50 having connector element 30 disposed thereon. Member 50 is configured to cooperate with cavity 20 of tablet computer device 10 to facilitate detachably coupling of overlay membrane 12 to tablet computer device 10. Connector element 30 communicatively couples keyboard 42 to tablet computer device 10 by communicatively engaging corresponding connector element 24 disposed within cavity 20.

Figure 2:
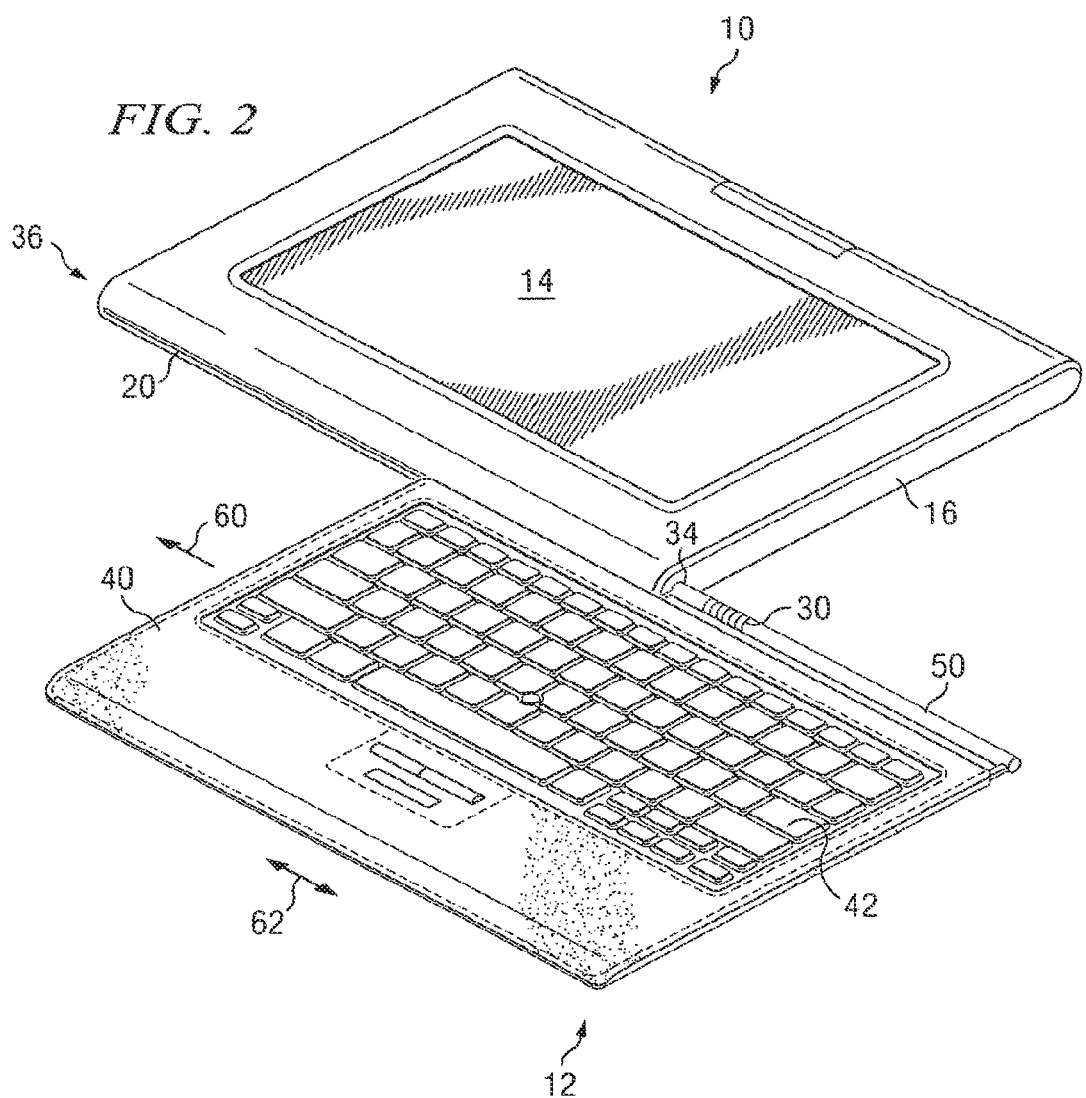
FIG. 2 is a diagram illustrating partial engagement of the overlay membrane of FIG. 1 with the tablet computer device of FIG. 1.
Figure 3:
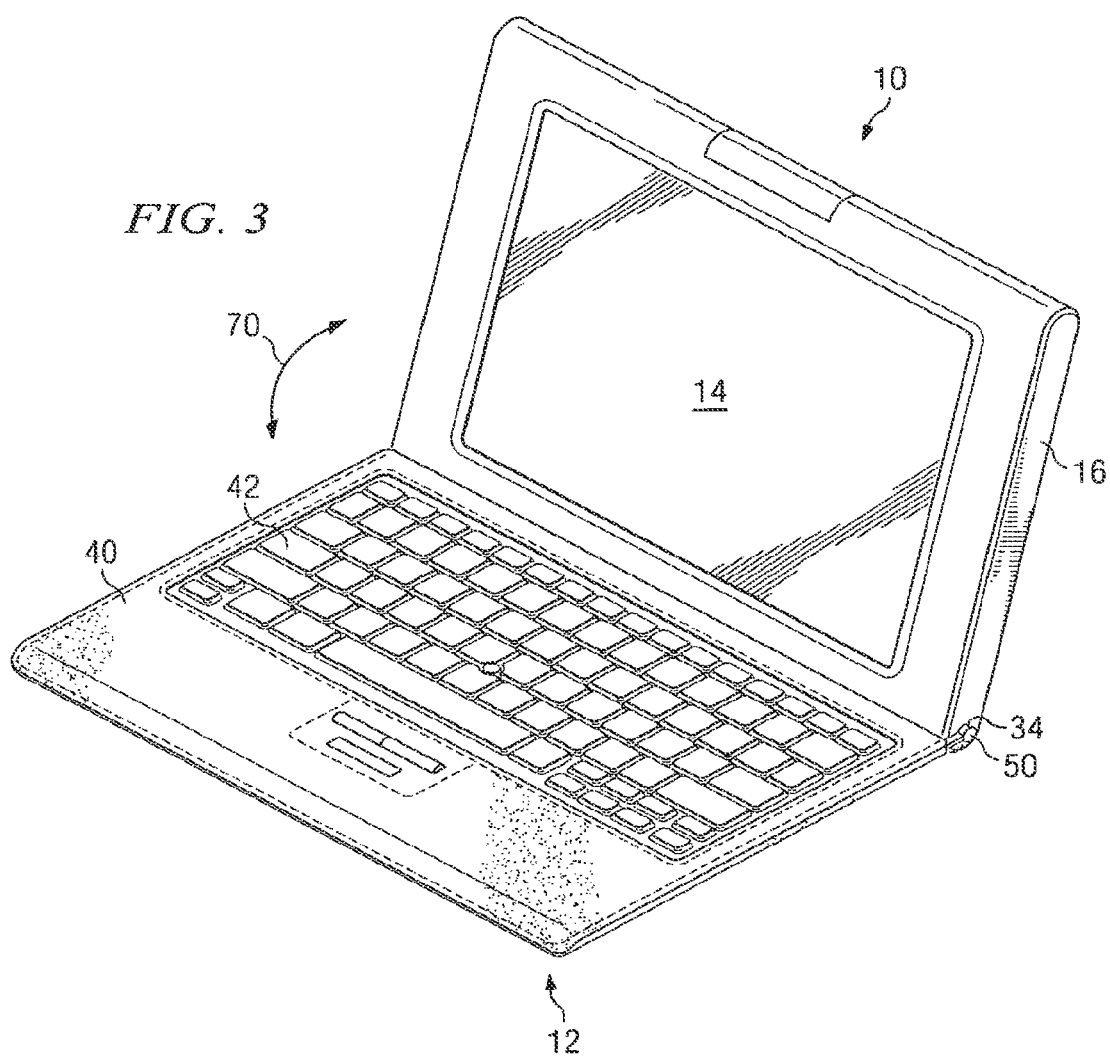
FIG. 3 is a diagram illustrating engagement of the overlay membrane of FIG. 1 with the tablet computer device of FIG. 1.

FIG. 2 is a diagram illustrating partial engagement of overlay membrane 12 of FIG. 1 with tablet computer device 10 of FIG. 1, and FIG. 3 is a diagram illustrating full engagement of overlay membrane 12 of FIG. 1 with tablet computer device 10 of FIG. 1. As best illustrated in FIG. 2, elongate member 50 is inserted into open end 34 of cavity 20 and moved in the direction indicated by 60 relative to tablet computer device 10 to slideably engage overlay membrane 12 with tablet computer device 10. Preferably, a dimension of overlay membrane 12 and/or length of cavity 20 in the direction indicated generally by 62 is configured such that engagement of a corresponding end of elongate member 50 with closed end 36 when overlay membrane 12 is inserted within cavity 20 aligns and correspondingly engages connector element 30 of overlay membrane 12 with connector element 24 of tablet computer device 10 (FIG. 1). However, it should be understood that other methods may be used to provide alignment and/or engagement of connector elements 24 and 30.

As best illustrated in FIG. 3, overlay membrane 12 and tablet computer device 10 are movable relative to each other in the direction indicated by 70 to facilitate placement of panel 40 over display element 14 to protect display element 14. Further, as illustrated in FIG. 3, overlay membrane 12 facilitates keyboard 42 use with tablet computer device 10 by having keyboard 42 integrated within overlay membrane 12. Accordingly, embodiments of the present invention facilitate easy coupling of overlay membrane 12 to tablet computer device 10 to facilitate protection of display element 14 and/or use of keyboard 42 with tablet computer device 10.

FIG. 4 is a diagram illustrating another embodiment of overlay membrane 12 in accordance with the present invention. In the embodiment illustrated in FIG. 4, overlay membrane 12 comprises panel 40, a panel 80 and a panel 82. Preferably, panels 40, 80 and 82 are formed integrally with each other (e.g., formed as a unitary structure), thereby providing portfolio-type cover. However, it should be understood that overlay membrane 12 may be otherwise manufactured. In the embodiment illustrated in FIG. 4, overlay membrane 12 facilitates at least partial enclosure of tablet computer device 10 within overlay membrane 12, thereby providing additional protection of tablet computer device 10. For example, in the embodiment illustrated in FIG. 4, panel 80 is configured to extend along a rear surface 86 of tablet computer device 10, and panel 82 is configured to extend slightly beyond a side or top portion 88 of tablet computer device 10 such that when panel 40 of overlay membrane 12 is disposed near or against display element 14, panel 82 is extendable downwardly to engage at least a portion of panel 40 (e.g., an outer surface 90 of panel 40) to releasably secure panel 82 to panel 40 (e.g., using hook-and-loop fasteners or otherwise 92). Thus, panels 40, 80 and 82 are configured to extend about an entire perimeter of tablet computer device 10 in at least one direction to enclose tablet computer device 10 within overlay membrane 12 to protect tablet computer device 10 and also enable keyboard 42 use therewith.

Thus, embodiments of the present invention provide a thin, protective overlay membrane 12 for protecting display element 14 of tablet computer device 10 and enabling use of a keyboard 42 with tablet computer device 10. Embodiments of the present invention facilitate easy attachment and detachment of overlay membrane 12 to tablet computer device 10, thereby providing flexible use of overlay membrane 12 and/or tablet computer device 10.

What is claimed is:

1. A tablet computer device, comprising:
a housing of the tablet computer device having a first side and a second side opposite the first side, wherein the housing has a height and a width,
the housing of the tablet computer device supporting a display element at the first side, and supporting a sectioned panel at the second side opposite the first side,
wherein the sectioned panel includes a bend portion, a first panel section devoid of keyboard elements and extended in a first direction from the bend portion along the second side of the housing of the tablet computer device, and a second panel section devoid of keyboard elements and extended in a second direction from the bend portion, the second panel section pivotable relative to the first panel section about the bend portion, the second panel section having a width corresponding to a width of the first panel section and a height less than a height of the first panel section and the second panel section having an exposed edge extended the width thereof and exposed opposite edges extended the height thereof, wherein the second panel section extends beyond a top portion of the tablet computing device to contact a surface of an overlay membrane when the overlay member is disposed against the display element.

2. The tablet computer device of claim 1, wherein the second panel section is pivotable relative to the first panel section away from and toward an edge of the housing.

3. The tablet computer device of claim 1, wherein the first panel section and the second panel section each extend between and to opposite sides of the housing.

4. The tablet computer device of claim 3, wherein the first panel section extends to a first edge of the housing extended between the opposite sides of the housing, and the second panel section extends beyond a second, opposite edge of the housing extended between the opposite sides of the housing.

5. The tablet computer device of claim 1, wherein the bend portion, the first panel section, and the second panel section are integrally formed with each other.

6. The tablet computer device of claim 1, wherein the width is greater than the height of the housing.

7. The tablet computer device of claim 6, wherein the bend portion, the first panel section, and the second panel section each has a width approximately equal to the width of the housing and is pivotable, relative to the first panel, along an entire width of the second panel to releasable secure the second panel to the panel of the overlay membrane.

8. The tablet computer device of claim 6, wherein an edge of the first panel section extends along an edge of the housing coinciding with the width of the housing.

9. The tablet computer device of claim 6, wherein the second panel section is pivotable relative to the first panel section about an axis of the bend portion coinciding with the width of the housing.

10. A tablet computer device, comprising:
a housing of the tablet computer device having a front surface and a back surface opposite the front surface, wherein the housing has a height and a width;
a display element provided at the front surface of the housing of the tablet computer device;
a back panel extended over the back surface of the housing of the tablet computer device; and
an adjustable panel pivotably supported from the back panel and adjustably positioned relative to the back surface of the housing of the tablet computer device,
the back panel having a blank surface in contact with the back surface of the housing of the tablet computer device,
the adjustable panel having a width aligned with a width of the back panel and a height less than a height of the back panel, and
the adjustable panel having an exposed edge extended the width thereof and exposed opposite edges extended the height thereof and including a fastener to releasably secure the adjustable panel to a panel of an overlay membrane of the table computing device when the overlay member is disposed against the display element.

11. The tablet computer device of claim 10, wherein an edge of the adjustable panel is positionable away from and toward the housing.

12. The tablet computer device of claim 10, wherein the adjustable panel is positionable at an angle relative to the back surface of the housing.

13. The tablet computer device of claim 10, wherein the back panel is separate from and coplanar with the back surface of the housing.

14. The tablet computer device of claim 10, wherein the width is greater than the height of the housing.

15. The tablet computer device of claim 14, wherein the width of the adjustable panel corresponds to the width of the housing and the height of the adjustable panel is less than the height of the housing.

16. The tablet computer device of claim 14, wherein the adjustable panel is adjustable about an axis coinciding with the width of the housing.

17. The tablet computer device of claim 16, wherein the back panel and the adjustable panel are devoid of keyboard elements.

18. The tablet computer device of claim 6, wherein the sectioned panel further includes a third panel section extended from the first panel section, the third panel section to support a keyboard.

19. The tablet computer device of claim 1, wherein the second panel section comprises a planar panel section having exposed planar surfaces on opposite sides thereof.

20. The tablet computer device of claim 10, wherein the adjustable panel comprises a planar panel having exposed planar surfaces on opposite sides thereof.

21. The tablet computer device of claim 10, wherein the fastener is a hook and loop fastener.

\* \* \* \* \*